United States Patent
Ye et al.

(10) Patent No.: US 12,348,321 B2
(45) Date of Patent: Jul. 1, 2025

(54) SYSTEM AND METHOD FOR SUPPORTING MULTICAST BROADCAST SERVICE (MBS) SERVICE IN NON-TERRESTRIAL NETWORK (NTN)

(71) Applicant: APPLE INC., Cupertino, CA (US)

(72) Inventors: Chunxuan Ye, San Diego, CA (US); Chunhai Yao, Beijing (CN); Dawei Zhang, Saratoga, CA (US); Haitong Sun, Cupertino, CA (US); Hong He, San Jose, CA (US); Oghenekome Oteri, San Diego, CA (US); Sigen Ye, San Diego, CA (US); Wei Zeng, Saratoga, CA (US); Weidong Yang, San Diego, CA (US); Yushu Zhang, Beijing (CN); Idan Bar-Sade, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/905,113

(22) PCT Filed: Sep. 24, 2021

(86) PCT No.: PCT/CN2021/120286
§ 371 (c)(1),
(2) Date: Aug. 26, 2022

(87) PCT Pub. No.: WO2023/044744
PCT Pub. Date: Mar. 30, 2023

(65) Prior Publication Data
US 2024/0204925 A1  Jun. 20, 2024

(51) Int. Cl.
*H04L 1/1867* (2023.01)
*H04L 1/1812* (2023.01)
*H04W 72/30* (2023.01)

(52) U.S. Cl.
CPC .......... *H04L 1/1887* (2013.01); *H04L 1/1812* (2013.01); *H04W 72/30* (2023.01)

(58) Field of Classification Search
CPC ... H04L 1/1887; H04L 1/1812; H04L 1/1896; H04L 1/1854; H04L 2001/0093; H04W 72/30; H04W 84/06
See application file for complete search history.

(56) References Cited

U.S. PATENT DOCUMENTS

| | | | |
|---|---|---|---|
| 2021/0037603 A1* | 2/2021 | Li | H04L 1/189 |
| 2021/0126744 A1 | 4/2021 | Hwang et al. | |

(Continued)

FOREIGN PATENT DOCUMENTS

| | | |
|---|---|---|
| CN | 111919503 A | 11/2020 |
| CN | 113163481 A | 7/2021 |

(Continued)

OTHER PUBLICATIONS

PCT/CN2021/120286, International Search Report and Written Opinion, Jun. 23, 2022, 8 pages.

(Continued)

*Primary Examiner* — Chae S Lee
(74) *Attorney, Agent, or Firm* — Dorsey & Whitney LLP

(57) ABSTRACT

The disclosure relates to system and method for supporting Multicast Broadcast Service (MBS) SERVICE in Non-terrestrial network (NTN). In some aspects, a user equipment (UE) device may comprises: at least one antenna; at least one radio, configured to perform wireless communication using at least one radio access technology; and one or more processor coupled to the at least one radio, wherein the at least one radio and the one or more processor are configured to receive Multicast Broadcast Service (MBS) data, wherein the one or more processor are configured to case the UE device to: receive, from a network device, a (Continued)

timing offset indicating a slot offset for a Hybrid Automatic Repeat request (HARQ) feedback transmission; and determine a transmission timing for an HARQ feedback transmission for the MBS data based on the timing offset.

20 Claims, 5 Drawing Sheets

(56) References Cited

U.S. PATENT DOCUMENTS

| | | | |
|---|---|---|---|
| 2022/0240283 A1* | 7/2022 | Hong | H04L 1/1896 |
| 2022/0287048 A1* | 9/2022 | Lin | H04L 27/2655 |
| 2022/0322265 A1* | 10/2022 | Dai | H04W 56/00 |
| 2023/0062724 A1* | 3/2023 | Zhou | H04L 1/1861 |

FOREIGN PATENT DOCUMENTS

| | | | | |
|---|---|---|---|---|
| EP | 4391642 A1 * | 6/2024 | | H04W 28/04 |
| WO | 2020031155 A1 | 2/2020 | | |
| WO | 2021023049 A1 | 2/2021 | | |
| WO | 2021063395 A1 | 4/2021 | | |

OTHER PUBLICATIONS

Qualcomm Incorporated , "Start offset for RAR window and contention resolution timer", R2-2103053 (Revision of R2-2100740) 3GPP TSG-RAN WG2 Meeting #113bis-e, E-Meeting, Agenda Item 8.10.2.1, Apr. 12-20, 2021, 5 pages.

Moderator (FirstNet), "Email discussion for [RAN-RI 8-WS-non-eMBB-FirstNet]", RWS-210569, 3GPP TSG-RAN REL-18 workshop, Electronic Meeting, Agenda Item 4.2, Jun. 28-Jul. 2, 2021, 3 pages.

* cited by examiner

SYSTEM AND METHOD FOR SUPPORTING MULTICAST BROADCAST SERVICE (MBS) SERVICE IN NON-TERRESTRIAL NETWORK (NTN)

TECHNICAL FIELD

This application relates generally to wireless communication systems, including supporting Multicast Broadcast Service (MBS) service in non-terrestrial network (NTN).

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE), 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

In some cases, the wireless communication system may comprise one or more satellites which may relay signals or act as base stations, such as in non-terrestrial network (NTN). On the other hand, the NR has been proposed to support Multicast Broadcast Service (MBS) service. Thus, there is a need for techniques for supporting MBS service in NTN.

SUMMARY

In some aspects, a user equipment (UE) device may comprises: at least one antenna; at least one radio, configured to perform wireless communication using at least one radio access technology; and one or more processor coupled to the at least one radio, wherein the at least one radio and the one or more processor are configured to receive Multicast Broadcast Service (MBS) data, wherein the one or more processor are configured to case the UE device to: receive, from a network device, a timing offset indicating a slot offset for a Hybrid Automatic Repeat request (HARQ) feedback transmission; and determine a transmission timing for an HARQ feedback transmission for the MBS data based on the timing offset.

In some aspects, a non-transitory computer readable memory medium may store program instructions executable by one or more processor to cause a user equipment (UE) device to: receive, from a network device, a timing offset indicating a slot offset for a Hybrid Automatic Repeat request (HARQ) feedback transmission; and determine a transmission timing for an HARQ feedback transmission for the MBS data based on the timing offset.

In some aspects, a method may comprises: receiving, from a network device, a timing offset indicating a slot offset for a Hybrid Automatic Repeat request (HARQ) feedback transmission; and determining a transmission timing for an HARQ feedback transmission for the MBS data based on the timing offset.

In some aspects, a computer program product comprises computer program which, when executed by a processor of a user equipment (UE) device, causes the UE device to: receive, from a network device, a timing offset indicating a slot offset for a Hybrid Automatic Repeat request (HARQ) feedback transmission; and determine a transmission timing for an HARQ feedback transmission for the MBS data based on the timing offset.

According to some embodiments, the HARQ feedback transmission for the MBS data is a Non-Acknowledge (NACK) only based HARQ feedback.

According to some embodiments, the timing offset is a cell specific timing offset and carried in system information from the network device.

According to some embodiments, the timing offset is a group specific timing offset which is smaller than a cell specific timing offset, the group including a plurality of UE devices which receive the MBS data and do not locate at a cell edge.

According to some embodiments, the UE device may forgo the HARQ feedback transmission for the MBS data when the group specific timing offset is smaller than a UE specific timing offset.

According to some embodiments, the group specific timing offset is signaled via at least one of: Media Access Control (MAC) Channel Element (CE); group common Downlink Control Information (DCI) with Cyclic Redundancy Check (CRC) scrambled by Group Radio Network Temporary Identity (G-RNTI); RRC configuration; or the RRC configuration, with updated by the MAC CE or the group common DCI.

According to some embodiments, the timing offset is selected from a set of timing offsets received from the network device based on a UE specific timing offset.

According to some embodiments, the timing offset is selected as a smallest one in the set of timing offsets which is larger than or equal to the UE specific timing offset.

According to some embodiments, the UE device may determine a cell specific timing offset as the timing offset when the group specific timing offset is not configured, and determine the group specific timing offset as the timing offset when the group specific timing offset is configured.

According to some embodiments, the UE device may determine a cell specific timing offset as the timing offset when the set of timing offsets is not configured, and select the timing offset from the set of timing offsets when the set of timing offset is configured.

According to some embodiments, the UE device may stop the HARQ feedback transmission for the MBS data based on a determination that the UE device is away from a serving satellite beyond a threshold.

According to some embodiments, the UE device may make the determination if a UE specific Timing Advance (TA) or a UE full TA is larger than a TA threshold configured per MBS session.

According to some embodiments, the UE device may make the determination if a UE specific timing offset is larger than a timing offset threshold configured per MBS session.

According to some embodiments, the UE device may receive an amount of frequency compensation via a group common Downlink Control Information (DCI) from the network device.

The techniques described herein may be implemented in and/or used with a number of different types of devices, including but not limited to cellular base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
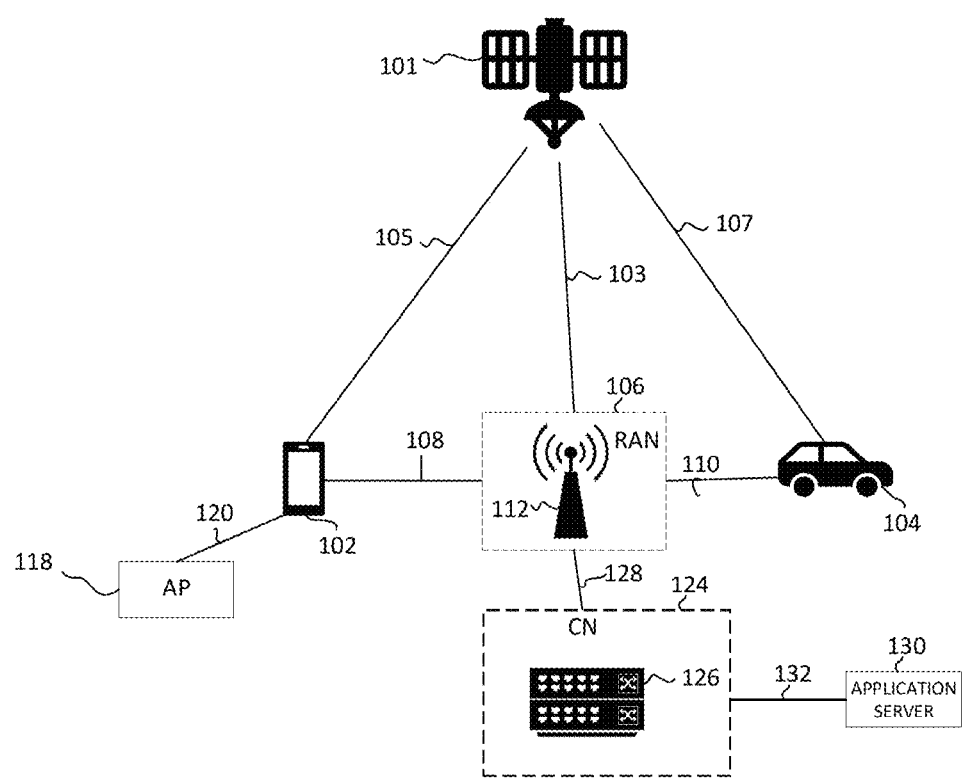
FIG. 1 illustrates an example architecture of a wireless communication system, according to embodiments disclosed herein.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component. Examples of a UE may include a mobile device, a personal digital assistant (PDA), a tablet computer, a laptop computer, a personal computer, an Internet of Things (IoT) device, or a machine type communications (MTC) device, among other examples, which may be implemented in various objects such as appliances, or vehicles, meters, among other examples.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, the wireless communication system 100 includes a satellite 101, UE 102 and UE 104 (although any number of UEs may be used), and base station 112. In this example, the UE 102 is illustrated as smartphone (e.g., handheld touchscreen mobile computing devices connectable to one or more cellular networks) and the UE 104 is illustrated as a vehicle, but may also comprise any mobile or non-mobile computing device configured for wireless communication.

The UE 102 and UE 104 may be configured to communicatively couple with a RAN 106. In embodiments, the RAN 106 may be NG-RAN, E-UTRAN, etc. The UE 102 and UE 104 utilize connections (or channels) (shown as connection 108 and connection 110, respectively) with the RAN 106, each of which comprises a physical communications interface. The RAN 106 can include one or more base stations, such as base station 112, that enable the connection 108 and connection 110.

In this example, the connection 108 and connection 110 are air interfaces to enable such communicative coupling, and may be consistent with RAT(s) used by the RAN 106, such as, for example, an LTE and/or NR.

In some embodiments, the UE 102 and UE 104 may also directly exchange communication data via a sidelink interface. The UE 104 is shown to be configured to access an access point (shown as AP 118) via connection 120. By way of example, the connection 120 can comprise a local wireless connection, such as a connection consistent with any IEEE 802.11 protocol, wherein the AP 118 may comprise a Wi-Fi® router. In this example, the AP 118 may be connected to another network (for example, the Internet) without going through a CN 124.

In embodiments, the UE 102 and UE 104 can be configured to communicate using orthogonal frequency division multiplexing (OFDM) communication signals with each other or with the base station 112 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers. In some embodiments, all or parts of the base station 112 may be implemented as one or more software entities running on server computers as part of a virtual network.

The RAN 106 is shown to be communicatively coupled to the CN 124. The CN 124 may comprise one or more network elements 126, which are configured to offer various data and telecommunications services to customers/subscribers (e.g., users of UE 102 and UE 104) who are connected to the CN 124 via the RAN 106. The components of the CN 124 may be implemented in one physical device or separate physical devices including components to read and execute instructions from a machine-readable or computer-readable medium (e.g., a non-transitory machine-readable storage medium).

In embodiments, the CN 124 may be an EPC, and the RAN 106 may be connected with the CN 124 via an S1 interface 128. In embodiments, the S1 interface 128 may be split into two parts, an S1 user plane (S1-U) interface, which carries traffic data between the base station 112 and a serving gateway (S-GW), and the S1-MME interface, which is a signaling interface between the base station 112 and mobility management entities (MMEs).

In embodiments, the CN 124 may be a 5GC, and the RAN 106 may be connected with the CN 124 via an NG interface 128. In embodiments, the NG interface 128 may be split into two parts, an NG user plane (NG-U) interface, which carries traffic data between the base station 112 and a user plane function (UPF), and the S1 control plane (NG-C) interface, which is a signaling interface between the base station 112 and access and mobility management functions (AMFs).

Generally, an application server 130 may be an element offering applications that use internet protocol (IP) bearer resources with the CN 124 (e.g., packet switched data services). The application server 130 can also be configured to support one or more communication services (e.g., VoIP sessions, group communication sessions, etc.) for the UE 102 and UE 104 via the CN 124. The application server 130 may communicate with the CN 124 through an IP communications interface 132.

In embodiments, the satellite 101 may communicate with base station 112 and UEs 102 and 104. Satellite 101 may be any suitable type of communication satellite configured to relay communications between different end nodes in a wireless communication system. Satellite 101 may be an example of a space satellite, a balloon, a dirigible, an airplane, a drone, an unmanned aerial vehicle, and/or the like. In some examples, the satellite 101 may be in a geosynchronous or geostationary earth orbit, a low earth orbit or a medium earth orbit. A satellite 101 may be a multi-beam satellite configured to provide service for multiple service beam coverage areas in a predefined geographical service area. The satellite 101 may be any distance away from the surface of the earth.

In embodiments, the satellite 101 may perform the functions of a base station 112, act as a bent-pipe satellite, or may act as a regenerative satellite, or a combination thereof. In other cases, satellite 101 may be an example of a smart satellite, or a satellite with intelligence. For example, a smart satellite may be configured to perform more functions than a regenerative satellite. A bent-pipe satellite may be configured to receive signals from ground stations and transmit those signals to different ground stations. A regenerative satellite may be configured to relay signals like the bent-pipe satellite, but may also use on-board processing to perform other functions. In the case of regenerative satellite, the satellite can be used as base station for the wireless communication.

Figure 2:
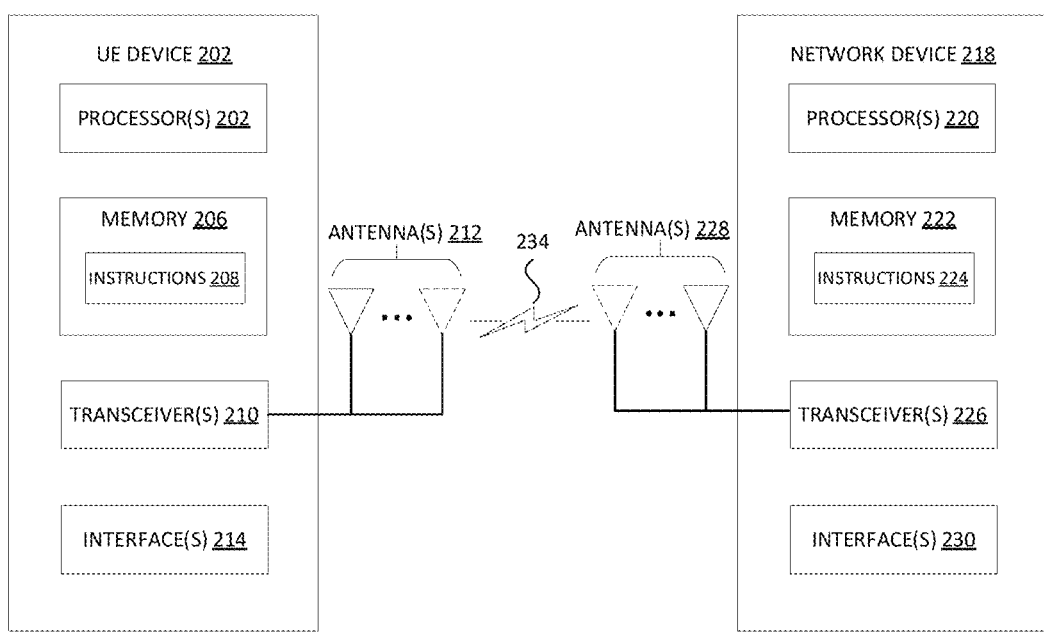
FIG. 2 illustrates a system for performing signaling between a wireless device and a network device, according to embodiments disclosed herein.

FIG. 2 illustrates a system 200 for performing signaling 234 between a wireless device 202 and a network device 218, according to embodiments disclosed herein. The system 200 may be a portion of a wireless communications system as herein described. The wireless device 202 may be, for example, a UE of a wireless communication system. The network device 218 may be, for example, a satellite or a base station (e.g., an eNB or a gNB) of a wireless communication system.

The wireless device 202 may include one or more processor(s) 204. The processor(s) 204 may execute instructions such that various operations of the wireless device 202 are performed, as described herein. The processor(s) 204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 202 may include a memory 206. The memory 206 may be a non-transitory computer-readable storage medium that stores instructions 208 (which may include, for example, the instructions being executed by the processor(s) 204). The instructions 208 may also be referred to as program code or a computer program. The memory 206 may also store data used by, and results computed by, the processor(s) 204.

The wireless device 202 may include one or more transceiver(s) 210 that may include radio frequency (RF) transmitter and/or receiver circuitry that use the antenna(s) 212 of the wireless device 202 to facilitate signaling (e.g., the signaling 234) to and/or from the wireless device 202 with other devices (e.g., the network device 218) according to corresponding RATs.

The wireless device 202 may include one or more antenna(s) 212 (e.g., one, two, four, or more). For embodiments with multiple antenna(s) 212, the wireless device 202 may leverage the spatial diversity of such multiple antenna(s) 212 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 202 may be accomplished according to precoding (or digital beamforming) that is applied at the wireless device 202 that multiplexes the data streams across the antenna(s) 212 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 202 may implement analog beamforming techniques, whereby phases of the signals sent by the antenna(s) 212 are relatively adjusted such that the (joint) transmission of the antenna(s) 212 can be directed (this is sometimes referred to as beam steering).

The wireless device 202 may include one or more interface(s) 214. The interface(s) 214 may be used to provide input to or output from the wireless device 202. For example, a wireless device 202 that is a UE may include interface(s) 214 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 210/antenna(s) 212 already described) that allow for communication between the UE and other devices and may operate according to known protocols (e.g., Wi-Fi®, Bluetooth®, and the like).

The network device 218 may include one or more processor(s) 220. The processor(s) 220 may execute instructions such that various operations of the network device 218 are performed, as described herein. The processor(s) 204 may include one or more baseband processors implemented using, for example, a CPU, a DSP, an ASIC, a controller, an FPGA device, another hardware device, a firmware device, or any combination thereof configured to perform the operations described herein.

The network device 218 may include a memory 222. The memory 222 may be a non-transitory computer-readable storage medium that stores instructions 224 (which may include, for example, the instructions being executed by the processor(s) 220). The instructions 224 may also be referred to as program code or a computer program. The memory 222 may also store data used by, and results computed by, the processor(s) 220.

The network device 218 may include one or more transceiver(s) 226 that may include RF transmitter and/or receiver circuitry that use the antenna(s) 228 of the network device 218 to facilitate signaling (e.g., the signaling 234) to and/or from the network device 218 with other devices (e.g., the wireless device 202) according to corresponding RATs.

The network device 218 may include one or more antenna(s) 228 (e.g., one, two, four, or more). In embodiments having multiple antenna(s) 228, the network device 218 may perform MIMO, digital beamforming, analog beamforming, beam steering, etc., as has been described.

The network device 218 may include one or more interface(s) 230. The interface(s) 230 may be used to provide input to or output from the network device 218. For example, a network device 218 that is a base station may include interface(s) 230 made up of transmitters, receivers, and other circuitry (e.g., other than the transceiver(s) 226/antenna(s) 228 already described) that enables the base station to communicate with other equipment in a core network, and/or that enables the base station to communicate with external networks, computers, databases, and the like for purposes of operations, administration, and maintenance of the base station or other equipment operably connected thereto.

When a UE receives a physical downlink shared channel (PDSCH) data sent by the network device, the UE needs to send a hybrid automatic repeat request (HARQ) feedback to the network device.

In an example case that a satellite 101 acts as the network device 218 in NTN, the network device 218 and the UEs may be thousands of kilometers apart and it may take some time for electromagnetic waves to propagate over the distance between the UEs and the satellite 101. The propagation delay for non-terrestrial networks may be many orders of magnitude larger than the propagation delay for terrestrial networks. In addition, high speeds of non-geostationary satellites, for example, such as the satellite 101 may promote variation in propagation delay. As a result, the UEs may experience variation in uplink and downlink timing synchronization with the satellite 101.

In order to provide synchronized uplink and downlink timing at the satellite 101, communications to and from the satellite may be made according to a satellite timing reference. The UE may adjust a timing of uplink communications to the satellite such that uplink communications are received at the satellite at a desired time.

A timing offset $K_{offset}$ is introduced in 3GPP agreements on NTN so that there is enough time for UE adjusting timing between receiving the PDSCH data and sending the HARQ feedback. The timing offset $K_{offset}$ may enhance the timing relationships in many aspects, including the transmission timing of Downlink Control Information (DCI) scheduled Physical Uplink Shared Channel (PUSCH), the transmission timing of Random Access Response (RAR) (fallback RAR) grant scheduled PUSCH, the transmission timing of the first transmission opportunity of PUSCH in configured grant type 2, the transmission timing of aperiodic Sounding Reference Signal (SRS), the transmission timing of HARQ-ACK on PUCCH, the transmission timing of HARQ-Acknowledgement (ACK) on PUCCH to Msg4/MsgB, the Channel State Information (CSI) reference resource timing, Time Advance (TA) command activation timing, etc. $K_{offset}$ may be updated after initial access.

For $K_{offset}$ used in initial access, the information of $K_{offset}$ is carried in system information from the network device to the UE. When UE is not provided with $K_{offset}$ value other than the one signaled in system information, the $K_{offset}$ value signaled in system information is used for all timing relationships that require $K_{offset}$ enhancement. The $K_{offset}$ value signaled in system information is always used for the transmission timing of RAR/fallback RAR grant scheduled PUSCH, the transmission timing of Msg3 retransmission scheduled by DCI format 0_0 with Cyclic Redundancy Check (CRC) scrambled by Temporary Cell-Radio Network Temporary Identity (TC-RNTI), the transmission timing of HARQ-ACK on PUCCH to contention resolution Physical Downlink Shared CHannel (PDSCH) scheduled by DCI format 1_0 with CRC scrambled by TC-RNTI, and the transmission timing of HARQ-ACK on PUCCH to MsgB scheduled by DCI format 1_0 with CRC scrambled by MsgB-RNTI.

NR has been proposed to support Multicast and Broadcast Services (MBS) where the network device may transmit one message to a plurality of UEs via one transmission. Various RAN basic functions for broadcast/multicast for UEs in Radio Resource Control (RRC)_CONNECTED state have been specified. Some required changes have been specified to improve reliability of Broadcast/Multicast service. e.g., by UL feedback. The level of reliability should be based on the requirements of the application/service provided.

For example, it is proposed that for RRC_CONNECTED UEs receiving multicast, NACK-only based HARQ-ACK feedback is supported for saving uplink resources. Also, PUCCH format 0 and format 1 are supported for NACK-only based HARQ-ACK feedback for multicast. Therefore, PUCCH resource for NACK-only can be shared by UEs transmitting the NACK-only based HARQ-ACK feedback.

The disclosure will describe techniques for supporting MBS service in NTN. The following a technique for determining the HARQ feedback transmission timing for MBS data will be discussed firstly.

Different UEs have different UE specific $K_{offset}$ value. However, in NACK only feedback for MBS data, the HARQ-NACK from all the UEs need to be received at gNB, i.e., satellite at the same time. That is to say, same HARQ resources are shared by all UEs. In ACK/NACK based feedback, the HARQ from all the UEs is preferred to be received at gNB (satellite) at approximate time. An embodiment for determining HARQ feedback transmission timing will be explained by reference to FIG. 3.

Figure 3:
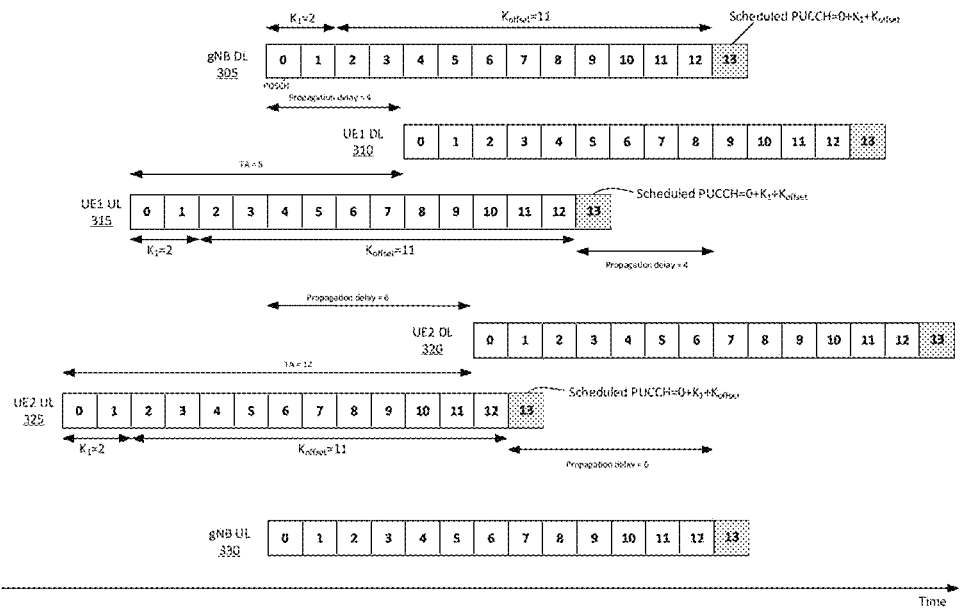
FIG. 3 illustrates an example of a slot timing that supports MBS service in NTN, according to embodiments disclosed herein.

FIG. 3 illustrates an example of a slot timing that supports MBS service in NTN, according to embodiments disclosed herein. In some examples, slot timing of FIG. 3 may be implemented by a UE 102 or 104 for estimating and determining uplink timing in a non-terrestrial network, as described with reference to FIGS. 1 and 2. Although FIG. 3 shows only two UEs, i.e., UE1 and UE2, for implementing the technique disclosed here, those skilled in the art would understand this number of UEs is not limited to two, but can be any number which may be configured to receive MBS service.

In this example, a gNB DL timing 305 may have a number of slots. The gNB may schedule the UEs to transmit an uplink transmission in slot of $n+K_1+K_{offset}$, where n is the slot of receiving PDSCH, $K_1$ is indicated in DCI, and $K_{offset}$ is the timing offset indicating a slot offset for a HARQ feedback transmission. In the example of FIG. 3, n is illustrated as 0, $K_1$ is illustrated as 2, and $K_{offset}$ is illustrated as 11. Thus, the gNB may schedule the UEs to transmit an uplink transmission in slot 13.

A UE1 DL timing 310 may lag the gNB DL timing 305 by an amount of propagation delay between the UE1 and the gNB, which is illustrated as 4 slots in this example. In order to provide uplink communications that are received at the gNB, UE1 UL timing 315 may have a timing advance (TA) ahead of the UE1 DL timing 310, which is illustrated as 8 slots in this example. Based on the timing advance and propagation delay, the UE1 may determine a UL timing for the HARQ feedback, i.e., slot 13 in the UE1 UL timing 315.

Likewise, A UE2 DL timing 320 may lag the gNB DL timing 305 by an amount of propagation delay between the UE2 and the gNB, which is illustrated as 6 slots in this example. In order to provide uplink communications that are received at the gNB, UE2 UL timing 325 may have a TA ahead of the UE2 DL timing 320, which is illustrated as 12 slots in this example. Based on the timing advance and propagation delay, the UE2 may determine a UL timing for the HARQ feedback, i.e., slot 13 in the UE2 UL timing 325. The $K_{offset}$ applied to UE2 is small comparing with its TA value, and this limits the processing time at UE2.

Since the UE1 and UE2 share the PUCCH resource for HARQ feedback for MBS service in NTN, the gNB receives the HARQ feedbacks from all the UEs at the gNB UL timing 330.

In some embodiments, $K_{offset}$ used by UEs may be cell specific which is broadcast as system information.

In some embodiments, $K_{offset}$ used by UEs may be group specific. In particular, if a group of UEs receiving MBS services do not include cell edge UEs, then a group wise $K_{offset}$ could be distributed. A group wise $K_{offset}$ is generally smaller than cell specific $K_{offset}$. Each UE applies group wise $K_{offset}$ in determining the HARQ feedback timing. If the group wise $K_{offset}$ is smaller than UE specific $K_{offset}$, then it means that the UE is out of the range of MBS service. In this case, the UE does not feedback HARQ for MBS. The group wise $K_{offset}$ can be distributed via various signalings, including but not limited to a Media Access Control (MAC) Channel Element (CE), a group common Downlink Control Information (DCI) with Cyclic Redundancy Check (CRC) scrambled by Group Radio Network Temporary Identity (G-RNTI), a RRC configuration, or the combination of the above, for example, the RRC configuration with updated by the MAC CE or the group common DCI.

In some embodiments, there may be multiple PUCCH resources for NACK only feedback. In this case, each UE may determine an appropriate $K_{offset}$ depending on UE specific $K_{offset}$. In particular, a set of $K_{offset}$ values may be configured for the MBS service, which meet $K_{offset,g1} < K_{offset,g2} < \ldots < K_{offset,gn}$. Each UE may determine the corresponding $K_{offset,gi}$ (i=1, ..., n) from the set of $K_{offset}$ values based on UE specific $K_{offset}$. For example, $K_{offset,gi}$ is the smallest value in the set of $K_{offset}$ values which is larger than or equal to UE specific $K_{offset}$.

In some embodiments, the cell specific $K_{offset}$ and the group specific $K_{offset}$ or the set of specific $K_{offset}$ values can be combined for determining the timing of HARQ feedback. For example, if the group specific $K_{offset}$ or the set of group specific $K_{offset}$ values is not configured, then the cell specific $K_{offset}$ is used. Otherwise, the group specific $K_{offset}$ or the set of specific $K_{offset}$ values is used.

Figure 4:
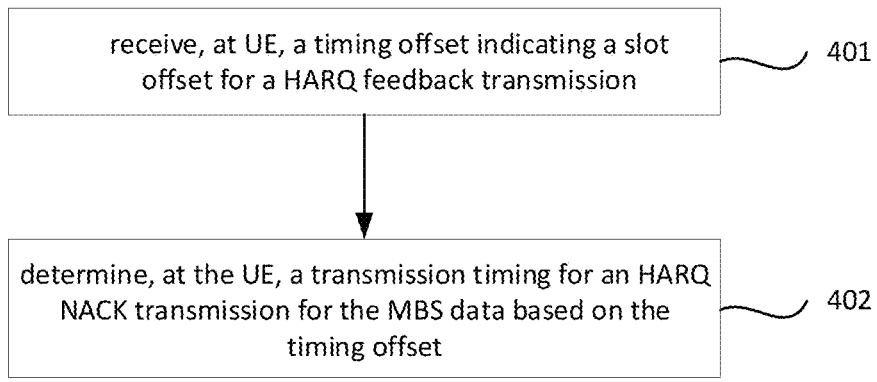
FIG. 4 is a flowchart diagram illustrating an example method for determining a transmission timing for an HARQ feedback transmission for MBS data, by a UE device, according to embodiments disclosed herein.

FIG. 4 is a flowchart diagram illustrating an example method for determining a transmission timing for an HARQ feedback transmission for MBS data according to embodiments disclosed herein. Aspects of the method of FIG. 4 may be implemented by a wireless device such as a UE 102 or UE 104 illustrated in various of the Figures herein and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 4 may operate as follows.

At 401, a UE device may receive, from a network device, a timing offset $K_{offset}$ indicating a slot offset for a Hybrid Automatic Repeat request (HARQ) feedback transmission.

In one example, the timing offset may be a cell specific timing offset $K_{offset}$ and carried in system information from the network device.

In another example, the timing offset may be a group specific timing offset $K_{offset}$ which is smaller than a cell specific timing offset $K_{offset}$. The group may include a plurality of UE devices which receive the MBS data and do not locate at a cell edge.

The group specific timing offset $K_{offset}$ may be signaled via at least one of: Media Access Control (MAC) Channel Element (CE); group common Downlink Control Information (DCI) with Cyclic Redundancy Check (CRC) scrambled by Group Radio Network Temporary Identity (G-RNTI); RRC configuration; or the RRC configuration, with updated by the MAC CE or the group common DCI.

In yet another example, UE may receive a set of timing offsets, $K_{offset,g1}$, $K_{offset,g2}$, ..., $K_{offset,gn}$ from the network device. The operation of UE in this case will be described by reference to FIG. 5 hereafter.

At 402, the UE device may determine a transmission timing for an HARQ NACK transmission for MBS data based on the received or determined timing offset.

In a case that the timing offset is a cell specific timing offset $K_{offset}$, for example, the UE1 may determine a UL timing for the HARQ feedback in slot of $n+K_1$+cell specific $K_{offset}$, i.e., slot 13 in the UE1 UL timing 315, by combining the timing advance, with reference to FIG. 3.

In a case that the timing offset is a group specific timing offset $K_{offset}$, the UE device may also determine a UL timing for the HARQ feedback in slot of $n+K_1$+group specific $K_{offset}$, in combination with the timing advance. The group wise $K_{offset}$ is generally smaller than cell specific $K_{offset}$ but larger than a UE specific $K_{offset}$. If the group wise $K_{offset}$ is smaller than UE specific $K_{offset}$, then the UE device may forgo the HARQ NACK transmission for the MBS data.

Figure 5:
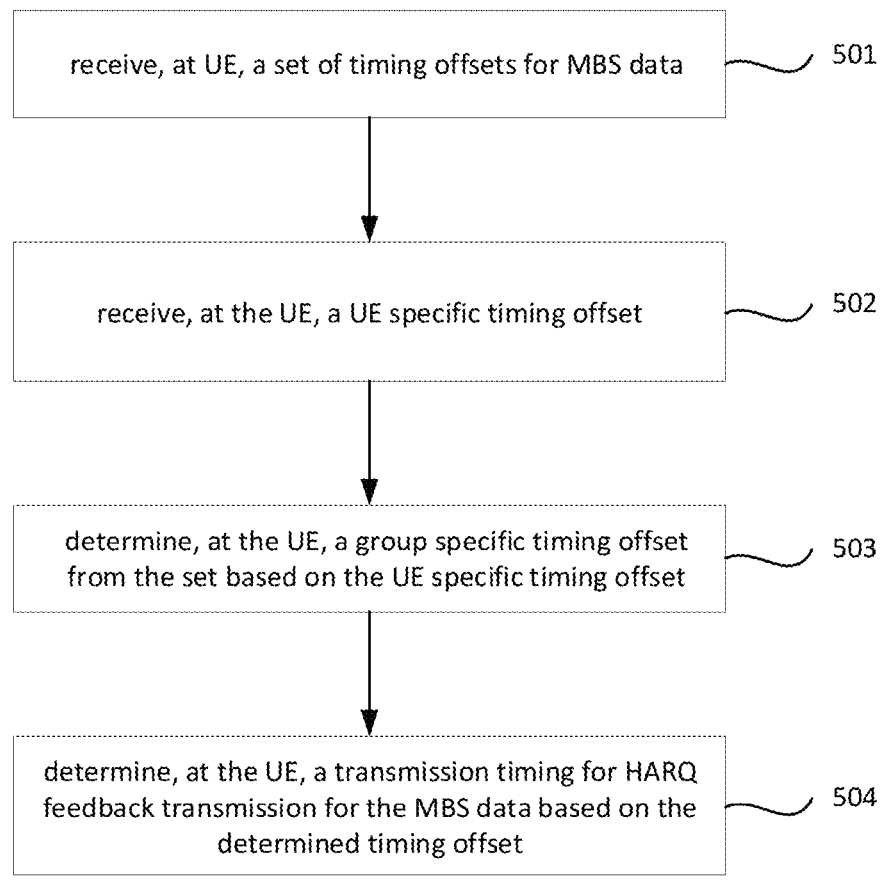
FIG. 5 is a flowchart diagram illustrating another example method for determining a transmission timing for an HARQ feedback transmission for MBS data, by a UE device, according to embodiments disclosed herein.

The operation of UE device in a case where UE device receives a set of timing offsets from the network device will be described by reference to FIG. 5.

At 501, the UE device may receive a set of $K_{offset}$ values for the MBS service, which meet $K_{offset,g1} < K_{offset,g2} < \ldots < K_{offset,gn}$, from the network device.

At 502, the UE device may receive a UE specific $K_{offset}$ for its unicast transmissions.

At 503, the UE device may determine the corresponding $K_{offset,gi}$ (i=1, ..., n) from the set of $K_{offset}$ values based on the UE specific $K_{offset}$. For example, $K_{offset,gi}$ may be the smallest value in the set of $K_{offset}$ values which is larger than or equal to the UE specific $K_{offset}$.

At 504, the UE device may determine a transmission timing for HARQ feedback transmission for the MBS data based on the determined timing offset. At this step, the UE device may determine a UL timing for the HARQ feedback in slot of $n+K_1$+determined $K_{offset}$, in combination with the timing advance and propagation delay.

The UE device may, at 402, use the combinations of the cell specific $K_{offset}$ and the group specific $K_{offset}$ or the set of group specific $K_{offset}$ values for determining the timing of HARQ feedback. For example, if the group specific $K_{offset}$ or the set of group specific $K_{offset}$ values is not configured, then the cell specific $K_{offset}$ is used. Otherwise, the group specific $K_{offset}$ or the set of specific $K_{offset}$ values is used.

The following an enabling/disabling feature on HARQ feedback for MBS data will be described by reference to FIG. 6.

The HARQ feedback may be configured to be disabled in NTN. In NTN for unicast service, enabling/disabling on HARQ feedback for downlink transmission should be at least configurable per HARQ process via UE specific RRC signaling. However, in NTN for MBS service, the enabling/disabling on HARQ feedback should be configurable per MBS session via RRC signaling. That is to say, all the HARQ processes corresponding to an MBS session should have the same feedback enabling/disabling feature. For example, an MBS session may be configured with MBS HARQ process ID #3 and #4. The enabling/disabling of HARQ feedback is configured for this MBS session, which means that the MBS HARQ processes with ID #3 and #4 have same feedback enabling/disabling feature. Regarding the HARQ-ACK codebook for feedback disabling MBS session, DCI field of Downlink Assignment Index (DAI) (T-DAI and C-DAI) may be reserved for the HARQ processes corresponding to MBS sessions with feedback disabled feature.

In some embodiments, the UE device may disable the HARQ feedback for the MBS data based on a determination that the UE device is away from a serving satellite beyond a threshold. There are various ways to determine whether the UE device is far from a serving satellite. For example, the UE device may use thresholds related to TA or $K_{offset}$.

Figure 6:
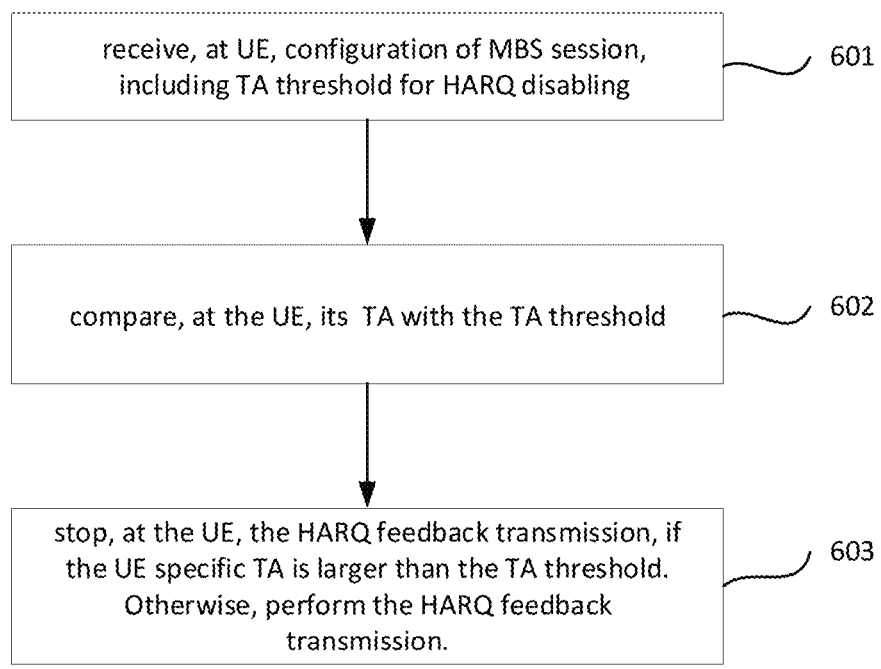
FIG. 6 is a flowchart diagram illustrating an example method for determining whether to disable an HARQ feedback transmission for MBS data, by a UE device, according to embodiments disclosed herein.

FIG. 6 illustrates an example method for determining whether to disable an HARQ feedback transmission for MBS data by using a threshold related to TA.

At 601, the UE device may receive a configuration of an MBS session. The configuration may include at least a TA threshold for HARQ disabling.

At 602, the UE device may compare its TA with the TA threshold. UE may maintain a TA by close and open loop control. The TA may be either full TA from UE to timing reference point or a UE specific TA from UE to satellite.

At 603, the UE device may stop the HARQ feedback transmission if the UE specific TA is larger than the TA threshold. Otherwise, the UE device may perform the HARQ feedback transmission.

Using a TA threshold may be suitable for NACK-only HARQ feedback case, since gNB does not know UE specific TA in general.

In another example, the UE device may use threshold related to $K_{offset}$. The operations of the UE device using $K_{offset}$ threshold are similar to those using TA threshold. In particular, the UE device may receive a $K_{offset}$ threshold for HARQ disabling. Then, the UE device may compare its $K_{offset}$ with the $K_{offset}$ threshold. The UE device may stop the HARQ feedback transmission if the UE specific $K_{offset}$ is larger than the $K_{offset}$ threshold. Otherwise, the UE device may perform the HARQ feedback transmission.

Using a $K_{offset}$ threshold may be suitable for both NACK-only HARQ feedback or ACK-NACK HARQ feedback, since both gNB and UE knows the UE specific $K_{offset}$.

The thresholds may be dynamically indicated in group common DCI and may be configured per MBS session.

According to some aspects, in NTN, the communications between the satellite and UEs are referred as service link, and the communications between the satellite and ground gateway are referred as feeder link. If DL frequency compensation for the service link Doppler is applied, indication of the amount of frequency compensation is necessary.

In DL broadcast, the amount of frequency compensation may be indicated in system information. In DL unicast, the amount of frequency compensation may be configured and indicated via UE specific RRC signaling.

In NTN for MBS service, the amount of frequency compensation may be indicated via the group common DCI.

Embodiments contemplated herein include one or more non-transitory computer-readable media comprising instructions to cause an electronic device, upon execution of the instructions by one or more processors of the electronic device, to perform one or more elements of the methods as above. This non-transitory computer-readable media may be, for example, a memory of a UE (such as a memory 206 of a wireless device 202 that is a UE, as described herein).

Embodiments contemplated herein include an apparatus comprising logic, modules, or circuitry to perform one or more elements of the methods as above. This apparatus may be, for example, an apparatus of a UE (such as a wireless device 202 that is a UE, as described herein).

Embodiments contemplated herein include an apparatus comprising: one or more processors and one or more computer-readable media comprising instructions that, when executed by the one or more processors, cause the one or more processors to perform one or more elements of the methods as above. This apparatus may be, for example, an apparatus of a UE (such as a wireless device 202 that is a UE, as described herein).

Embodiments contemplated herein include a signal as described in or related to one or more elements of the methods as above.

Embodiments contemplated herein include a computer program or computer program product comprising instructions, wherein execution of the program by a processor is to cause the processor to carry out one or more elements of the methods as above. The processor may be a processor of a UE (such as a processor(s) 204 of a wireless device 202 that is a UE, as described herein). These instructions may be, for example, located in the processor and/or on a memory of the UE (such as a memory 206 of a wireless device 202 that is a UE, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A user equipment (UE) device, comprising:
at least one antenna;
at least one radio, configured to perform wireless communication using at least one radio access technology; and
one or more processors coupled to the at least one radio, wherein the at least one radio and the one or more processors are configured to receive Multicast Broadcast Service (MBS) data,
wherein the one or more processors are configured to cause the UE device to:
receive, from a network device, a timing offset indicating a slot offset for a Hybrid Automatic Repeat request (HARQ) feedback transmission, wherein the timing offset is a group specific timing offset which is smaller than a cell specific timing offset, the group including a plurality of UE devices which receive the MBS data and do not locate at a cell edge;
determine a transmission timing for an HARQ feedback transmission for the MBS data based on the timing offset; and
forgo the HARQ feedback transmission for the MBS data when the group specific timing offset is smaller than a UE specific timing offset.

2. The UE device according to claim 1, wherein the HARQ feedback transmission for the MBS data is a Non-Acknowledge (NACK) only based HARQ feedback.

3. The UE device according to claim 1, wherein the timing offset is selected from a set of timing offsets received from the network device based on the UE specific timing offset.

4. The UE device according to claim 3, wherein the timing offset is selected as a smallest one in the set of timing offsets which is larger than or equal to the UE specific timing offset.

5. The UE device according to claim 3, wherein the one or more processors are further configured to cause the UE device to:
determine the cell specific timing offset as the timing offset when the set of timing offsets is not configured; and
select the timing offset from the set of timing offsets when the set of timing offsets is configured.

6. The UE device according to claim 1, wherein the one or more processors are further configured to cause the UE device to:
stop the HARQ feedback transmission for the MBS data based on a determination that the UE device is away from a serving satellite beyond a threshold.

7. The UE device according to claim 6, wherein the one or more processors are further configured to cause the UE device to:
make the determination if a UE specific Timing Advance (TA) or a UE full TA is larger than a TA threshold configured per MBS session.

8. The UE device according to claim 6, wherein the one or more processors are further configured to cause the UE device to:
  make the determination if the UE specific timing offset is larger than a timing offset threshold configured per MBS session.

9. The UE device according to claim 1, wherein the one or more processors are further configured to cause the UE device to:
  receive an amount of frequency compensation via a group common Downlink Control Information (DCI) from the network device.

10. A non-transitory computer readable memory medium storing program instructions executable by one or more processors to cause a user equipment (UE) device to:
  receive, from a network device, a timing offset indicating a slot offset for a Hybrid Automatic Repeat request (HARQ) feedback transmission, wherein the timing offset is a group specific timing offset which is smaller than a cell specific timing offset, the group including a plurality of UE devices which receive Multicast Broadcast Service (MBS) data and do not locate at a cell edge;
  determine a transmission timing for an HARQ feedback transmission for MBS data based on the timing offset; and
  forgo the HARQ feedback transmission for the MBS data when the group specific timing offset is smaller than a UE specific timing offset.

11. The non-transitory computer readable memory medium according to claim 10, wherein the HARQ feedback transmission for the MBS data is a Non-Acknowledge (NACK) only based HARQ feedback.

12. The non-transitory computer readable memory medium according to claim 10, wherein the timing offset is selected from a set of timing offsets received from the network device based on the UE specific timing offset.

13. The non-transitory computer readable memory medium according to claim 10, wherein the program instructions are executable by the one or more processors to further cause the UE device to:
  stop the HARQ feedback transmission for the MBS data based on a determination that the UE device is away from a serving satellite beyond a threshold.

14. A method, comprising:
  receiving, from a network device, a timing offset indicating a slot offset for a Hybrid Automatic Repeat request (HARQ) feedback transmission, wherein the timing offset is a group specific timing offset which is smaller than a cell specific timing offset, the group including a plurality of UE devices which receive Multicast Broadcast Service (MBS) data and do not locate at a cell edge;
  determining a transmission timing for an HARQ feedback transmission for the MBS data based on the timing offset; and
  forgoing the HARQ feedback transmission for the MBS data when the group specific timing offset is smaller than a UE specific timing offset.

15. The method according to claim 14, wherein the HARQ feedback transmission for the MBS data is a Non-Acknowledge (NACK) only based HARQ feedback.

16. The non-transitory computer readable memory medium according to claim 12, wherein the timing offset is selected as a smallest one in the set of timing offsets which is larger than or equal to the UE specific timing offset.

17. The non-transitory computer readable memory medium according to claim 12, wherein the program instructions are executable by the one or more processors to further cause the UE device to:
  determine the cell specific timing offset as the timing offset when the set of timing offsets is not configured; and
  select the timing offset from the set of timing offsets when the set of timing offsets is configured.

18. The non-transitory computer readable memory medium according to claim 13, wherein the program instructions are executable by the one or more processors to further cause the UE device to:
  make the determination if a UE specific Timing Advance (TA) or a UE full TA is larger than a TA threshold configured per MBS session.

19. The non-transitory computer readable memory medium according to claim 13, wherein the program instructions are executable by the one or more processors to further cause the UE device to:
  make the determination if the UE specific timing offset is larger than a timing offset threshold configured per MBS session.

20. The non-transitory computer readable memory medium according to claim 10, wherein the program instructions are executable by the one or more processors to further cause the UE device to:
  receive an amount of frequency compensation via a group common Downlink Control Information (DCI) from the network device.

* * * * *